(12) United States Patent
Conzola et al.

(10) Patent No.: US 6,720,954 B2
(45) Date of Patent: Apr. 13, 2004

(54) METHOD TO AID IN SIZING GRAPHICAL USER INTERFACE TOUCH CONTROLS

(75) Inventors: Vincent Charles Conzola, Raleigh, NC (US); Kerry A Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 09/808,257

(22) Filed: Mar. 14, 2001

(65) Prior Publication Data

US 2002/0130847 A1 Sep. 19, 2002

(51) Int. Cl.[7] .................................................. G09G 5/00
(52) U.S. Cl. ........................................ 345/173; 345/178
(58) Field of Search ................................. 345/173, 178, 345/181

(56) References Cited

U.S. PATENT DOCUMENTS

| | | | | |
|---|---|---|---|---|
| 4,710,758 A | | 12/1987 | Mussler et al. ............. 340/712 |
| 4,903,012 A | * | 2/1990 | Ohuchi ........................ 345/178 |
| 5,010,323 A | * | 4/1991 | Hoffman ...................... 345/178 |
| 5,274,362 A | * | 12/1993 | Potvin ......................... 345/178 |
| 5,283,559 A | | 2/1994 | Kalendra et al. ............ 345/168 |
| 5,751,276 A | * | 5/1998 | Shih ............................ 345/178 |
| 5,940,065 A | | 8/1999 | Babb et al. .................. 345/178 |
| 6,441,807 B1 | * | 8/2002 | Yamaguchi .................. 345/173 |

* cited by examiner

*Primary Examiner*—Steven Saras
*Assistant Examiner*—Uchendu O. Anyaso
(74) *Attorney, Agent, or Firm*—Bruce Schelkopf

(57) ABSTRACT

A software tool acquires data on the position of touches relative to controls on a particular window or dialog box using touch screen controls. Subjects or users log on and the time the bring a dialog box into focus is time stamped. The coordinates of each touch is recorded along with a time stamp of the touches. The test sessions are saved in a data file identifying the subject. The software tool is used by a User Interface designer to design controls for a touch screen application. The acquired data is played back graphically to the designer where each touch appears as a dot or like indication over laid over a representation of the dialog box to which it relates. The acquired data may be displayed in various ways including composite, realtime or in a single dialog box or a single touch. Previous touch data may be kept or discarded giving the UI designer many options of how to analyze the dat to determine optimum size and placement of controls. The software tool may be integrated to a Graphic User Interface (GUI) building package for various software platforms.

48 Claims, 4 Drawing Sheets

METHOD TO AID IN SIZING GRAPHICAL USER INTERFACE TOUCH CONTROLS

TECHNICAL FIELD

The present invention relates in general to software tools and in particular to a software tool that a touch screen designer uses to establish the ergonomics of touch screen controls.

BACKGROUND INFORMATION

In designing touch screen user interfaces, the User Interface (UI) designer needs to make the controls (elements a user touches) large enough so that a user or subject can touch the controls without making errors. On the other hand, the UI designer does not want to make the controls too large and waste valuable screen real estate. In the prior art, the UI designer has a subject perform various tasks while recording the number of times the wrong control is touched. The UI designer may then resize the controls and test with the subjects again. To design a better UI, the designer needs to also know how many touches were near misses. Near misses may be an indication that the control is too small. In conducting user tests, another useful type of data indicates the distances touches fall from the center to the edge of the control. How far a touch falls from the center of a control may indicate that a control is too big if most touches fall far from the edge of the control. Presently, UI designers rely on a video of subjects interacting with a set of touch screen controls to determine the subjects success in actuating the controls. Since a successful UI for a touch screen is dependent on how well users are able to use the controls, there is a need for a software tool that enables UI designers to automatically collect data describing a subject's interaction with a particular set of touch screen controls.

SUMMARY OF THE INVENTION

A software tool receives data which establishes where a user touched the screen relative to a particular touch screen control. The software tool has links so that positional data, relative to a set of designed touch screen controls, are stored along with the time that each control is touched. Each user of a particular touch screen design has their own set of recorded touches. When a different UI dialog (window) with a set of controls obtains the user focus, the time that the dialog obtains the focus and a dialog identifier are saved in a file. As the user touches the screen, the screen coordinates relative to the dialog are saved as well as the time of each touch. After the session is over, the UI designer may then display a graphic representation of the dialog with individual touches displayed as small dots. This graphical representation is used by the UI designer to determine the optimum placement and size of the controls for the UI.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
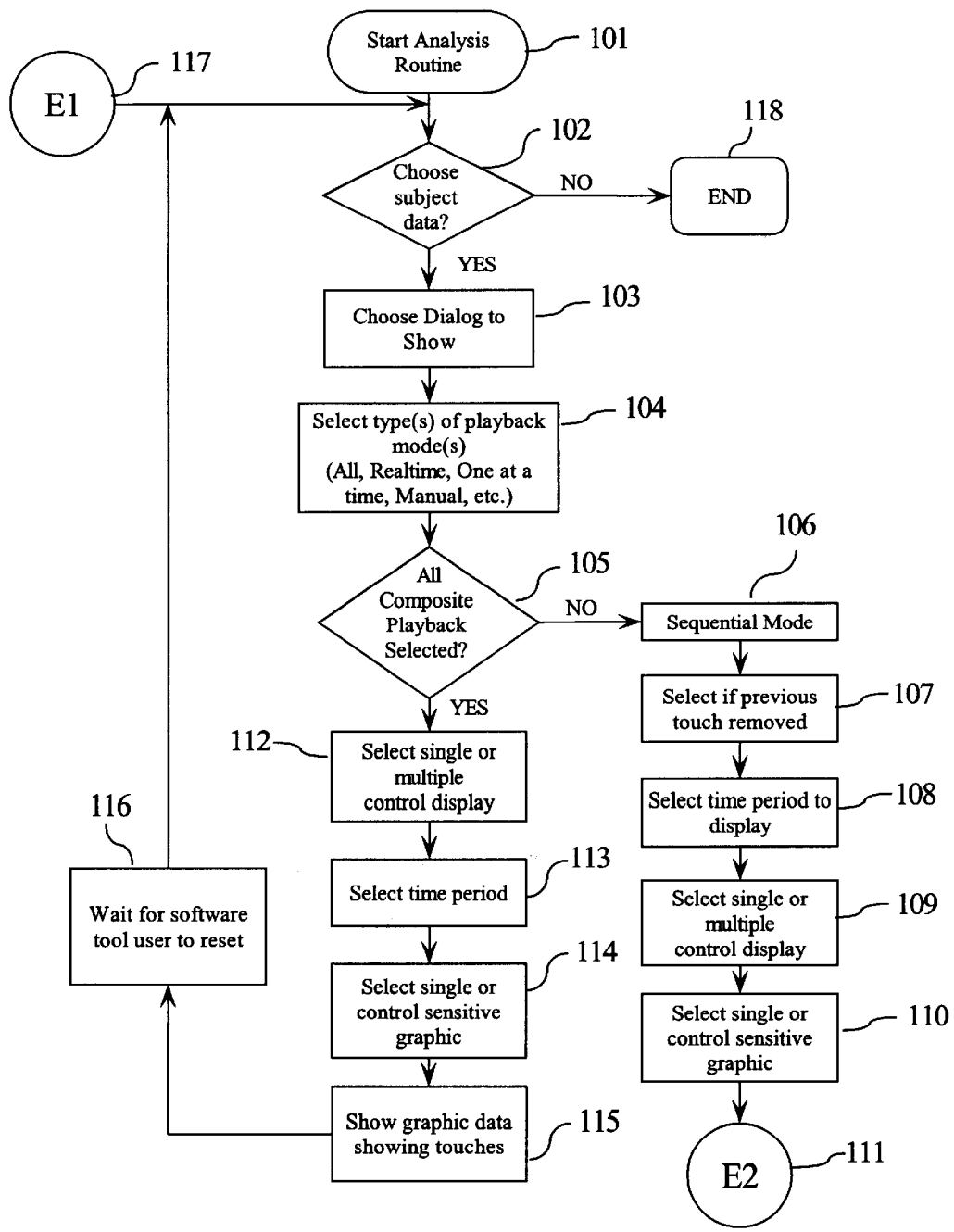
FIG. 1 is a flow diagram of method steps in an embodiment of the present invention.

In the following description, numerous specific details are set forth to provide a thorough understanding of the present invention. However, it will be obvious to those skilled in the art that the present invention may be practiced without such specific details. For the most part, some details and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

In embodiments of the present invention, each subject or user has their own set of recorded touch data. When a different UI dialog box or window on the display obtains the subject focus, the time that the dialog box obtains the focus and a dialog box identifier are saved in a file. As the subject touches the screen, the screen coordinates of the touch relative to the dialog box are saved as well as the time of the touch. After a data recording session is over, the UI designer may then display a graphic representation of the dialog box or window along with the touches acquired as the subject was using the dialog box controls. These touches may be shown on a representation of the dialog box as small dots or other graphic indicators. The UI designer may then use the graphic representations to determine the size of the control. If the software tool, according to embodiments of the present invention, is part of a Graphic User Interface (GUI) building package, then the software tool may record which particular control was touched as well as the screen location of the touch itself.

The software tool, according to embodiments of the present invention, comprises several different display modes for the touch data for each dialog box or window. These display modes are listed in the following:

1. Show all recorded touches for all recorded users as a composite data. In this mode no distinction is made as to which subject generated the data.
2. Show all touches for a selected single user. In this mode, a particular subject's data is displayed. The subject may have particular characteristics that the UI designer wishes to study in detail with all the recorded touches shown at once as a composite.
3. Show touches for an offset of time (single or selected users). In this mode, the UI designer selects which user recordings to show based on a span of time offset from the beginning of the recording. This mode displays only a selected portion of a subject's data.
4. Playback the screen touches of a single user in a sequential mode. In this mode, each touch is shown one at a time. The touches may be displayed as they were acquired in realtime or in fixed time between touches. The display, in this mode, may also keep or discard a previous touch when displaying a new touch data point.

5. Show the touches that only fall within a specific area of the dialog box. In this case, the GUI designer selects a particular area of the dialog box in which the software tool displays the touch data.

6. Show the touch data as different graphic elements depending on a previous touch data point (e.g., the graphic is different depending on the proceeding control that was touched).

The modes of display listed above may be used in various combinations. For example a UI designer may choose to display in Modes 4, 5 and 6 above. In this case, the touches of a single user that fall in a specific area of the dialog box are displayed in a sequential mode (realtime or fixed time) while showing a different graphic depending on the source of a proceeding touch. Other combinations of the above display modes may also be used and are within embodiments of the present invention.

Figure 3:
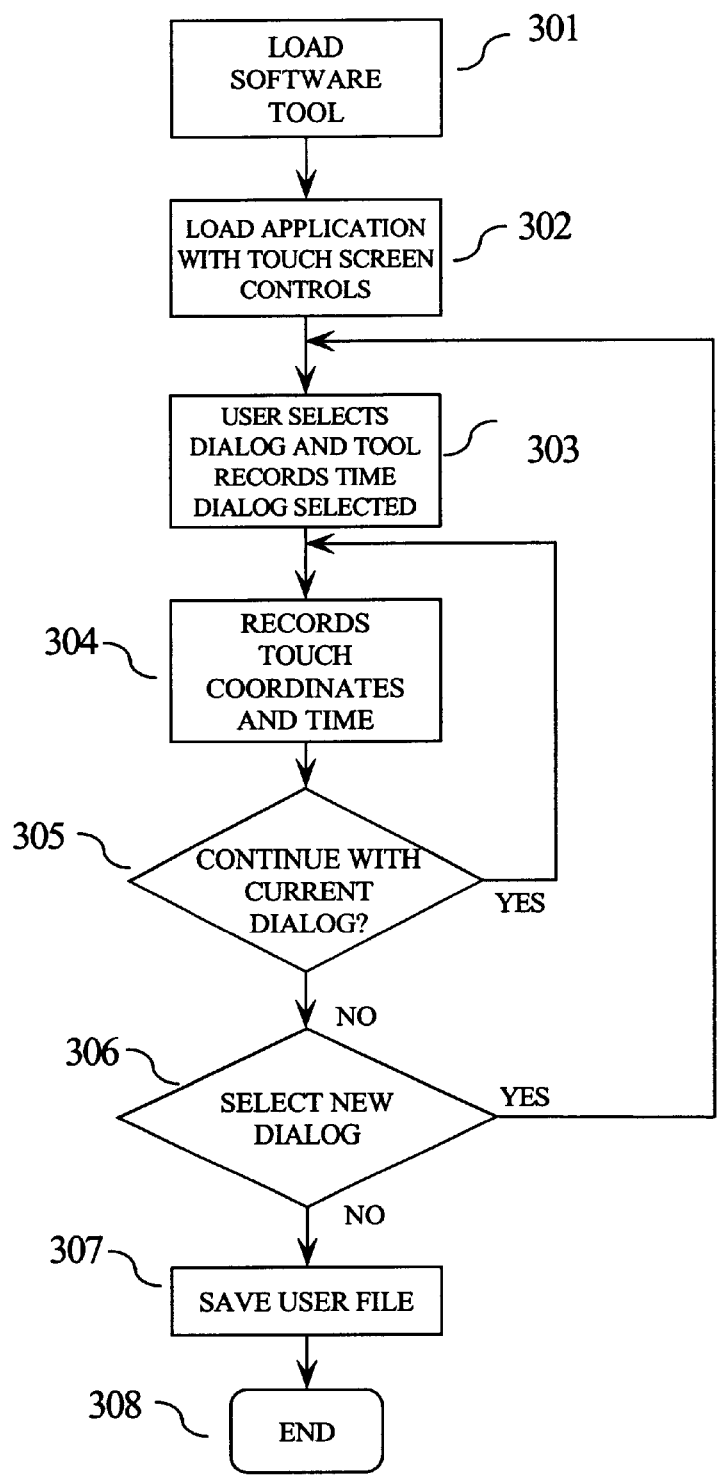
FIG. 3 is a flow diagram of method steps used in acquiring data according to embodiments of the present invention.

FIG. 3 is a flow diagram of method steps used in acquiring data generated by a subject using touch screen controls according to embodiments of the present invention. In step 301, the software tool of the present invention is loaded into a system employing a touch screen. In step 302, the application that utilizes the particular touch screen controls under test is loaded. In step 303, the subject or user selects a dialog box or window of the application with a certain set of controls and the software tool records the time the window was selected. In step 304, the software tool records touch coordinates and the time the touches were made as a subject interacts with the application via the touch controls of the dialog box or window. A test is done in step 305 to determine if the subject wants to continue with the current window. If the result of the test in step 305 is YES, then in step 304 the software tool continues to record touch coordinates and the time they were made. If the result in step 305 is NO, then a test is done in step 306 to determine whether to select a new window. If the result of the test in step 306 is YES, then a branch is executed to step 303 where a new window is selected. If the result of the test in step 306 is NO, then the subject file is saved in step 306 and an End is executed in step 308.

Figure 2:
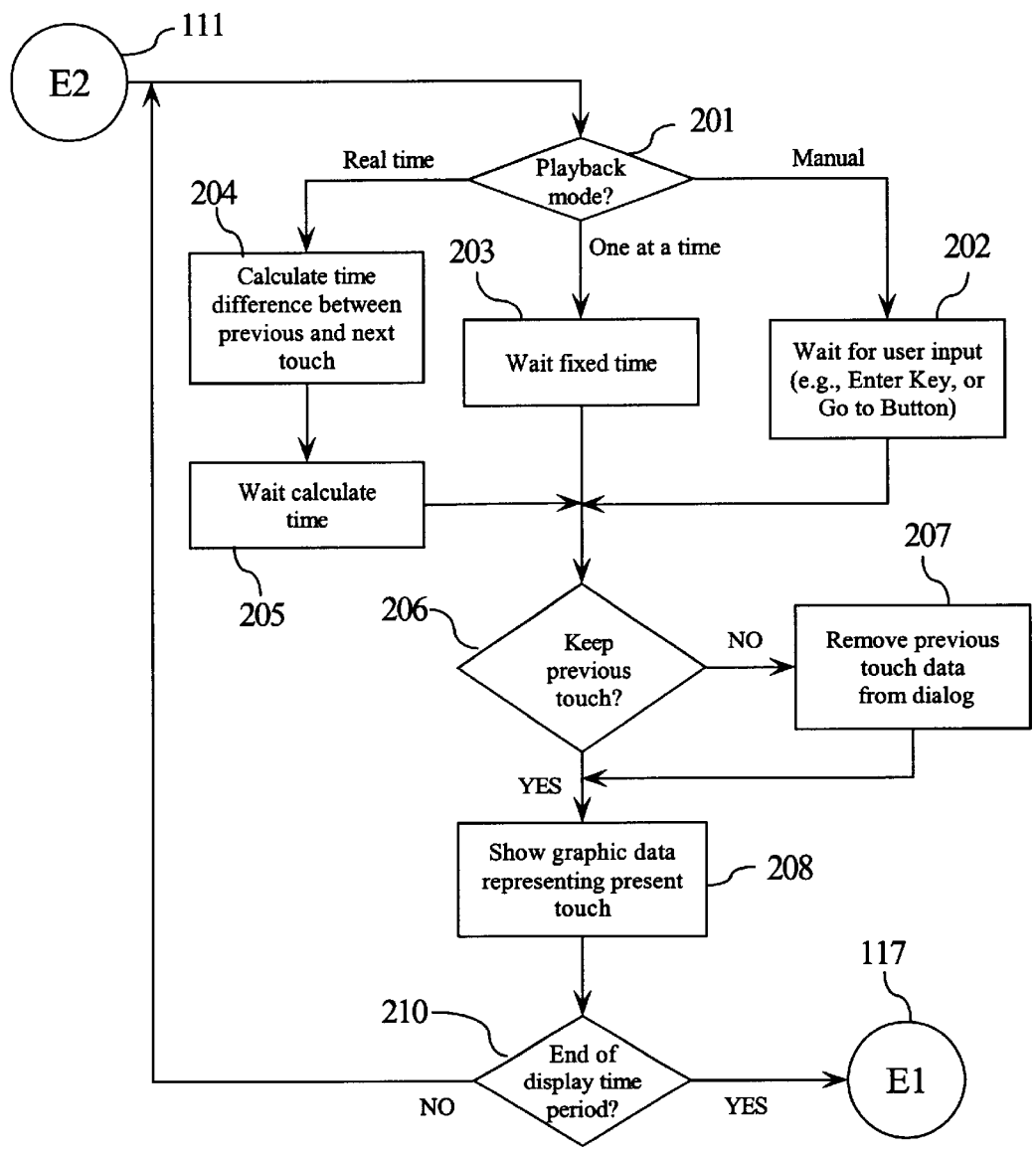
FIG. 2 is a flow diagram of method steps in an embodiment of the present invention.

FIGS. 1 and 2 together form a flow diagram relating how a designer may use data acquired in the steps of FIG. 3 according to embodiments of the present invention. Entry points between the two portions of the flow diagram are indicated by an "E1" or an "E2". In step 101, the analysis routine of the software tool is loaded. In step 102, the designer selects a subject data to analyze by opening a subject test file. In step 103, the designer selects a window or dialog box corresponding to a particular subject to analyze. In step 104, the playback mode is selected to use during analysis. If the playback mode "All composite" is selected in step 104, then the data generated by all the subjects (one or more) for a particular window or dialog box is displayed. The "All composite" mode is contrasted with a sequential display mode of displaying touches. A test is done in step 105 to determine if the "All composite" mode has been selected. If the result of the test in step 105 is YES, then in step 112 the data representing touches for a single or multiple controls is selected. In step 113, a time period from within the total test time is selected for display. In step 114, a selection is made to display a single graphic for the touches or display multiple graphics where the graphic depends on a previous touch position. Multiple graphics may be used if it is one wants to differentiate a particular touch based on a user's previous touch. This may demonstrate a directionality problem depending on how a user approaches a control. In step 115, all the touch data are displayed as a composite. In step 116, a wait is issued until the software user resets or exits the present mode and branches to step 102 and chooses a new subject to analyze or ends the analysis in step 118.

If the result of the test in step 105 is NO, then a sequential mode is the default in step 106. In a sequential mode, the touch data is displayed one touch at a time with the software tool user having options as to how the touch data is displayed sequentially. If the "Realtime" was selected in step 104, then in this sequential mode the playback of the touch patterns for a subject will happen at the rate that the subject generated the touches. If the "One at a time" sequential mode is selected in step 104, then each touch that the subject generated will be shown one at a time with a fixed time between displayed touches. If the Manual sequential mode is selected in step 104, then the touch data may be displayed single stepping through each touch data point of a particular subject. In the Manual mode, graphic dots representing the touches are added each time a key or a button is depressed. All display modes, except "All composite", proceed through step 106.

In step 107, a selection is made to either keep previous displayed touch data in an additive mode or to remove a previous touch data point and only show a present touch data point. In step 108, a time period within the test session is selected to display. In step 109, a single graphic is chosen to display the touch data or multiple graphics may be selected to display touch data dependent on a previous touch. After step 110, a branch is made to entry E2 111 in the part of the flow diagram in FIG. 2.

In step 201, the path for the selected option of step 104 is determined. If "Realtime" is selected, then in step 204 the time difference between the previous and the next touch data is calculated and in step 205 the calculated time is used to set a wait time before going to step 206 where a determination is made whether the option to keep the previous displayed touch data was made in step 107. If the result of the determination in step 206 is NO, then the previously displayed touch data is removed and a branch is made to step 208 to display the present touch data only. If the result of the test in step 206 is YES, then in step 208 the graphic data (dots on the screen) representing the present and previous touch data are displayed. In step 210, a test is done to determine if the time period selected in step 108 has expired. If the result of the test in step 210 is NO, a branch back to step 201 is executed to continue. Since the playback mode will not have changed, then the sequential touch data display will continue until the result of the test in step 210 is YES. If the result of the test in step 210 is YES, then a branch back to entry E1 11 in FIG. 1 is executed to choose a new subject data file in step 102.

If the playback mode in step 201 is "One at a time", then in step 203 a wait is executed for a fixed time and steps 206, 207, 208, and 210 are again executed as described above for the "Realtime" mode. If the playback mode in step 201 is "Manual", then in step 202 a wait is executed until an "Enter key" or a "Go to button" is activated, then steps 206, 207, 208, and 210 are again executed as described above for the "Realtime" mode.

Figure 4:
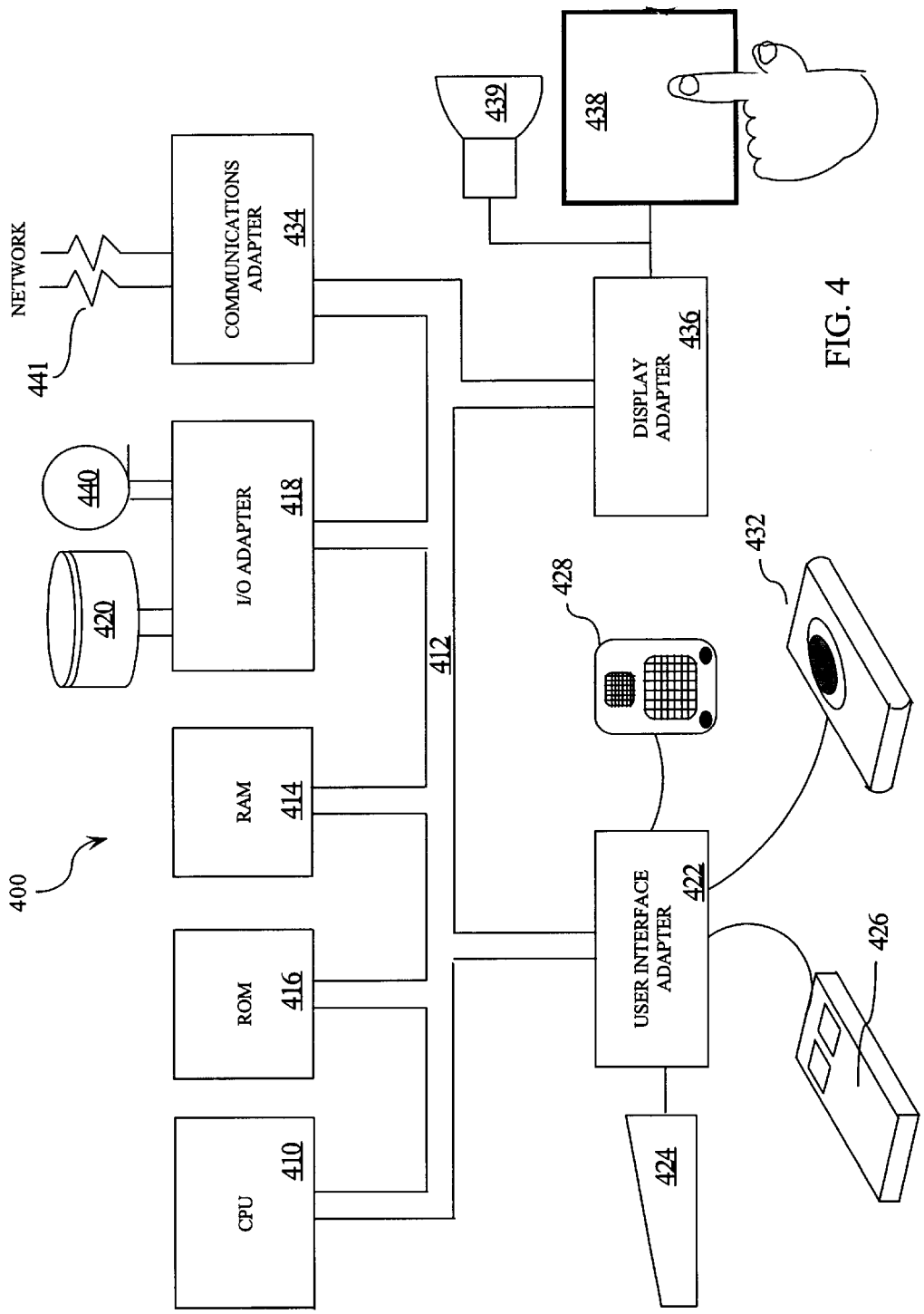
FIG. 4 is a block diagram of a data processing system which may execute embodiments of the present invention.

FIG. 4 is a high level functional block diagram of a representative data processing system 400 suitable for practicing the principles of the present invention. Data processing system 400, includes a central processing system (CPU) 410 operating in conjunction with a system bus 412. System bus 412 operates in accordance with a standard bus protocol, such that as the ISA protocol, compatible with CPU 410. CPU 410 operates in conjunction with read-only memory (ROM) 416 and random access memory (RAM) 414.

Among other things, ROM 416 supports the Basic Input Output System (BIOS). RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 426, touch pad 432 or speaker 428 to the processing devices on bus 412. Display adapter 436 supports a touch screen display 438 for acquiring touch data according to embodiments of the present invention. Touch screen 438 and display 439 which may be, for example, a cathode ray tube (CRT), liquid crystal display (LCD) or similar conventional display units, may be used to display data acquired using the software tool according to embodiments of the present invention. Display adapter 436 may include among other things a conventional display controller and frame buffer memory. Data processing system 400 may be selectively coupled to a computer or telecommunications network 441 through communications adapter 434. Communications adapter 434 may include, for example, a modem for connection to a telecom network and/or hardware and software for connecting to a computer network such as a local area network (LAN) or a wide area network (WAN).

Although the present invention and its advantages have been described in detail, it should be understood that various changes, substitutions and alterations can be made herein without departing from the spirit and scope of the invention as defined by the appended claims.

What is claimed is:

1. A method for designing touch screen controls for touch screen comprising the steps of:
    executing a data acquisition routine of a software tool, said data acquisition routine acquiring, over a test session, touch data corresponding to user touches of said touch screen controls for an application program, said touch screen controls disposed in a dialog box of said touch screen;
    saving said touch data in a file;
    executing an analysis routine within said software tool, said analysis routine generating graphic display elements corresponding to said touch data; and
    displaying said graphic display elements in selected playback modes, wherein said touch data comprises touch coordinates of said user touches relative to said touch screen dialog box, and a relative time said user touch was made.

2. The method of claim 1, wherein each of said graphic display elements are displayed overlaid on a graphical representation of said touch screen controls and said touch screen dialog box.

3. The method of claim 1, wherein display coordinates of said graphic display elements have a one to one correspondence to said touch coordinates of said user touches.

4. The method of claim 1, wherein said touch data further comprises an identification of said user of said touch screen.

5. The method of claim 4, wherein said touch data further comprises a time said touch screen dialog box obtains a focus of said user.

6. The method of claim 5, wherein said touch data further comprises an identification of each touch screen dialog box in use.

7. The method of claim 6, wherein said touch data further comprises an identification of a particular touch screen control to which each user touch relates.

8. The method of claim 1, wherein said selected playback modes comprise:
    displaying concurrently as a composite all of said graphic display elements corresponding to said test session of one or more users of a selected touch screen dialog box.

9. The method of claim 1, wherein said selected playback modes comprise:
    displaying concurrently as a composite first selected graphic display elements corresponding to said test session of said user of said touch screen dialog box, said first selected graphic display elements corresponding to user touches occurring offset in time from a beginning of said test session.

10. The method of claim 1, wherein said selected playback modes comprise displaying in a first time sequence said graphic display elements corresponding to said test session of said user of said touch screen dialog box, said first time sequence corresponding to a realtime sequence said touch data corresponding to said graphic display elements was acquired in said test session.

11. The method of claim 1, wherein said selected playback modes comprise displaying in a second time sequence said graphic display elements corresponding to said test session of said user of said touch screen dialog box, said second time sequence corresponding to a fixed time sequence.

12. The method of claim 1, wherein said selected playback modes comprise displaying in a third time sequence said graphic display elements corresponding to said test session of said user of said touch screen dialog box, said third time sequence corresponding to a time sequence determined by manual occurring input commands.

13. The method of claim 10, wherein said graphic display elements correspond to user touches which occur in a specific area of said touch screen dialog box.

14. The method of claim 10, wherein displaying a present graphic display element erases a previous graphic display element.

15. The method of claim 10, wherein displaying a present graphic display element retains a previous graphic display element.

16. The method of claim 10, wherein a graphic display element is modified in response to a position of a previous graphic display element.

17. A computer program product, said computer program product embodied in a machine readable medium, including programming for a processor, said computer program comprising a program of instructions for performing the program steps of:
    executing a data acquisition routine of said computer program product, said data acquisition routine acquiring, over a test session, touch data corresponding to user touches of touch screen controls for an application program, said touch screen controls disposed in a dialog box of said touch screen;
    saving said touch data in a file;
    executing an analysis routine within said computer program product, said analysis routine generating graphic display elements corresponding to said touch data; and
    displaying said graphic display elements in selected playback modes, wherein said touch data comprises touch coordinates of said user touches relative to said touch screen dialog box, and a relative time said user touch was made.

18. The computer program product of claim 17, wherein each of said graphic display elements are displayed overlaid on a graphical representation of said touch screen controls and said touch screen dialog box.

19. The computer program product of claim 17, wherein display coordinates of said graphic display elements have a one to one correspondence to said touch coordinates of said user touches.

20. The computer program product of claim 17, wherein said touch data further comprises an identification of said user of said touch screen.

21. The computer program product of claim 20, wherein said touch data further comprises a time said touch screen dialog box obtains a focus of said user.

22. The computer program product of claim 21, wherein said touch data further comprises an identification of each touch screen dialog box in use.

23. The computer program product of claim 22, wherein said touch data further comprises an identification of a particular touch screen control to which each user touch relates.

24. The computer program product of claim 17, wherein said selected playback modes comprise displaying concurrently as a composite all of said graphic display elements corresponding to said test session of one or more users of a selected touch screen dialog box.

25. The computer program product of claim 17, wherein said selected playback modes comprise displaying concurrently as a composite first selected graphic display elements corresponding to said test session of said user of said touch screen dialog box, said first selected graphic display elements corresponding to user touches occurring offset in time from a beginning of said test session.

26. The computer program product of claim 17, wherein said selected playback modes comprise displaying in a first time sequence said graphic display elements corresponding to said test session of said user of said touch screen dialog box, said first time sequence corresponding to a realtime sequence said touch data corresponding to said graphic display elements was acquired in said test session.

27. The computer program product of claim 17, wherein said selected playback modes comprise displaying in a second time sequence said graphic display elements corresponding to said test session of said user of said touch screen dialog box, said second time sequence corresponding to a fixed time sequence.

28. The computer program product of claim 17, wherein said selected playback modes comprise displaying in a third time sequence said graphic display elements corresponding to said test session of said user of said touch screen dialog box, said third time sequence corresponding to a time sequence determined by manual occurring input commands.

29. The computer program product of claim 26, wherein said graphic display elements correspond to user touches which occur in a specific area of said touch screen dialog box.

30. The computer program product of claim 26, wherein displaying a present graphic display element erases a previous graphic display element.

31. The computer program product of claim 26, wherein displaying a present graphic display element retains a previous graphic display element.

32. The computer program product of claim 26, wherein a graphic display element is modified in response to a position of a previous graphic display element.

33. A data processing system comprising:
a central processing unit (CPU);
random access memory (RAM); read only memory (ROM);
a display adapter;
an I/O adapter; and
a bus system coupling said CPU to said ROM, said RAM and said display adapter, wherein said CPU further comprises:
 a data acquisition circuit, said data acquisition circuit acquiring, over a test session, touch data corresponding to user touches of touch screen controls for an application program, said touch screen controls disposed in a dialog box of said touch screen, said touch screen coupled to said display adapter;
 a storage circuit operable to store said touch data in said RAM or a storage unit coupled to said I/O adapter;
 an analysis circuit, said analysis circuit generating graphic display elements corresponding to said touch data ; and
 a display circuit operable to display said graphic display elements on said touch screen or another display system coupled to said display adapter, said display of graphic display elements using selected playback modes, wherein said touch data comprises touch coordinates of said user touches relative to said touch screen dialog box, and a relative time said user touch was made and an identification of said user in said test session.

34. The data processing system of claim 33, wherein each of said graphic display elements are displayed overlaid on a graphical representation of said touch screen controls and said touch screen dialog box.

35. The data processing system of claim 33, wherein display coordinates of said graphic display elements have a one to one correspondence to said touch coordinates of said user touches.

36. The data processing system of claim 33, wherein said touch data further comprises an identification of said user of said touch screen.

37. The data processing system of claim 36, wherein said touch data further comprises a time said touch screen dialog box obtains a focus of said user.

38. The data processing system of claim 37, wherein said touch data further comprises an identification of each touch screen dialog box in use.

39. The data processing system of claim 38, wherein said touch data further comprises an identification of a particular touch screen control to which each user touch relates.

40. The data processing system of claim 33, wherein said selected playback modes comprise displaying concurrently as a composite all of said graphic display elements corresponding to said test session of one or more users of a selected touch screen dialog box.

41. The data processing system of claim 33, wherein said selected playback modes comprise displaying concurrently as a composite first selected graphic display elements corresponding to said test session of said user of said touch screen dialog box, said first selected graphic display elements corresponding to user touches occurring offset in time from a beginning of said test session.

42. The data processing system of claim 33, wherein said selected playback modes comprise displaying in a first time sequence said graphic display elements corresponding to said test session of said user of said touch screen dialog box, said first time sequence corresponding to a realtime sequence said touch data corresponding to said graphic display elements was acquired in said test session.

43. The data processing system of claim 33, wherein said selected playback modes comprise displaying in a second time sequence said graphic display elements corresponding to said test session of said user of said touch screen dialog box, said second time sequence corresponding to a fixed time sequence.

44. The data processing system of claim 33, wherein said selected playback modes comprise displaying in a third time sequence said graphic display elements corresponding to said test session of said user of said touch screen dialog box, said third time sequence corresponding to a time sequence determined by manual occurring input commands.

45. The data processing system of claim 42, wherein said graphic display elements correspond to user touches which occur in a specific area of said touch screen dialog box.

46. The data processing system of claim 42, wherein displaying a present graphic display element erases a previous graphic display element.

47. The data processing system of claim 42, wherein displaying a present graphic display element retains a previous graphic display element.

48. The data processing system of claim 42, wherein a graphic display element is modified in response to a position of a previous graphic display element.

* * * * *